US012619500B2

(12) United States Patent
Paulzagade

(10) Patent No.: US 12,619,500 B2
(45) Date of Patent: May 5, 2026

(54) DATA MANAGEMENT SYSTEM FOR DETECTING CHANGES IN A DATA MANAGEMENT SYSTEM

(71) Applicant: Druva Inc., Santa Clara, CA (US)

(72) Inventor: Sudhakar Paulzagade, Pune (IN)

(73) Assignee: Druva Inc., Santa Clara, CA (US)

( * ) Notice: Subject to any disclaimer, the term of this patent is extended or adjusted under 35 U.S.C. 154(b) by 0 days.

(21) Appl. No.: 18/218,738

(22) Filed: Jul. 6, 2023

(65) Prior Publication Data

US 2024/0045767 A1     Feb. 8, 2024

(30) Foreign Application Priority Data

Aug. 3, 2022     (IN) .............................. 202241044456

(51) Int. Cl.
*G06F 16/00*          (2019.01)
*G06F 11/1446*          (2026.01)
*G06F 16/182*          (2019.01)

(52) U.S. Cl.
CPC ...... *G06F 11/1451* (2013.01); *G06F 16/1824* (2019.01); *G06F 2201/84* (2013.01)

(58) Field of Classification Search
None
See application file for complete search history.

(56) References Cited

U.S. PATENT DOCUMENTS

| | | | | |
|---|---|---|---|---|
| 7,412,578 B2 * | 8/2008 | Hara | ........................ | G06F 16/10 707/999.204 |
| 8,078,583 B2 * | 12/2011 | Prahlad | ................... | G06F 3/067 707/610 |
| 9,430,331 B1 * | 8/2016 | Basov | ...................... | G06F 16/10 |
| 2011/0113012 A1 * | 5/2011 | Gruhl | .................. | G06F 11/1451 707/646 |
| 2014/0181034 A1 * | 6/2014 | Harrison | ............. | G06F 11/2069 707/646 |
| 2014/0181051 A1 * | 6/2014 | Montulli | ............. | H04L 67/1097 707/679 |
| 2015/0301899 A1 * | 10/2015 | Montulli | ............. | H04L 67/1097 714/19 |
| 2019/0205407 A1 * | 7/2019 | Ying | ...................... | G06F 16/125 |
| 2020/0117543 A1 * | 4/2020 | Zhang | ................... | G06F 3/0643 |
| 2020/0301880 A1 * | 9/2020 | George | ............... | G06F 11/1451 |
| 2020/0349012 A1 * | 11/2020 | Chopra | ............... | G06F 11/1453 |

(Continued)

*Primary Examiner* — Farhan M Syed
(74) *Attorney, Agent, or Firm* — Fenwick & West LLP

(57)          ABSTRACT

An incremental backup agent performs backup operations that synchronize database on client side to a server database. In one embodiment, such backup operations are incremental backups, where the agent may identify differences between the current directory with the latest backed up version. The agent may issue a direct RPC using SMB protocols or NFS protocols to fetch all entries of directories with metadata in a single RPC call, instead of issuing one call to fetch metadata for each directory entry. The agent may identify changes with efficiency by performing checksum changes in a DFS manner. Starting from a root directory, the agent may generate a checksum for each directory and compare the checksums on the client side with the retrieved fingerprints, and if the backup agent identifies that the fingerprints match, the backup agent may then go to a deeper level and compare the fingerprints for child directories.

20 Claims, 8 Drawing Sheets

100

(56) References Cited

U.S. PATENT DOCUMENTS

| | | | | |
|---|---|---|---|---|
| 2021/0042191 A1* | 2/2021 | Chauhan | ............. | G06F 11/1435 |
| 2021/0240583 A1* | 8/2021 | Upadhyay | ........... | G06F 11/1469 |
| 2021/0303528 A1* | 9/2021 | Meister | ................ | G06F 16/185 |
| 2022/0004461 A1* | 1/2022 | Jain | .................... | G06F 11/1464 |

* cited by examiner

100

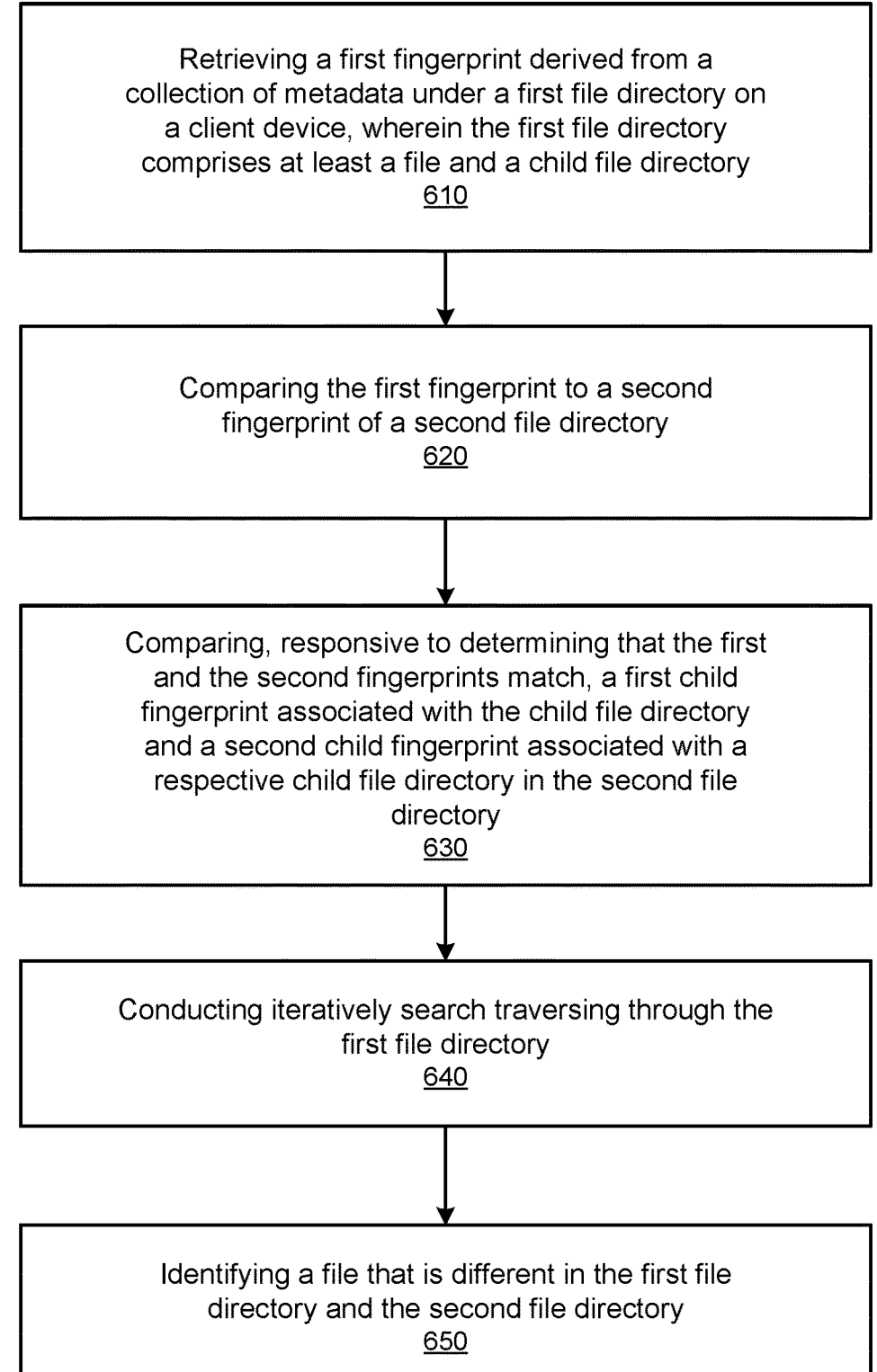

Retrieving a first fingerprint derived from a collection of metadata under a first file directory on a client device, wherein the first file directory comprises at least a file and a child file directory
610

Comparing the first fingerprint to a second fingerprint of a second file directory
620

Comparing, responsive to determining that the first and the second fingerprints match, a first child fingerprint associated with the child file directory and a second child fingerprint associated with a respective child file directory in the second file directory
630

Conducting iteratively search traversing through the first file directory
640

Identifying a file that is different in the first file directory and the second file directory
650

*FIG. 6*

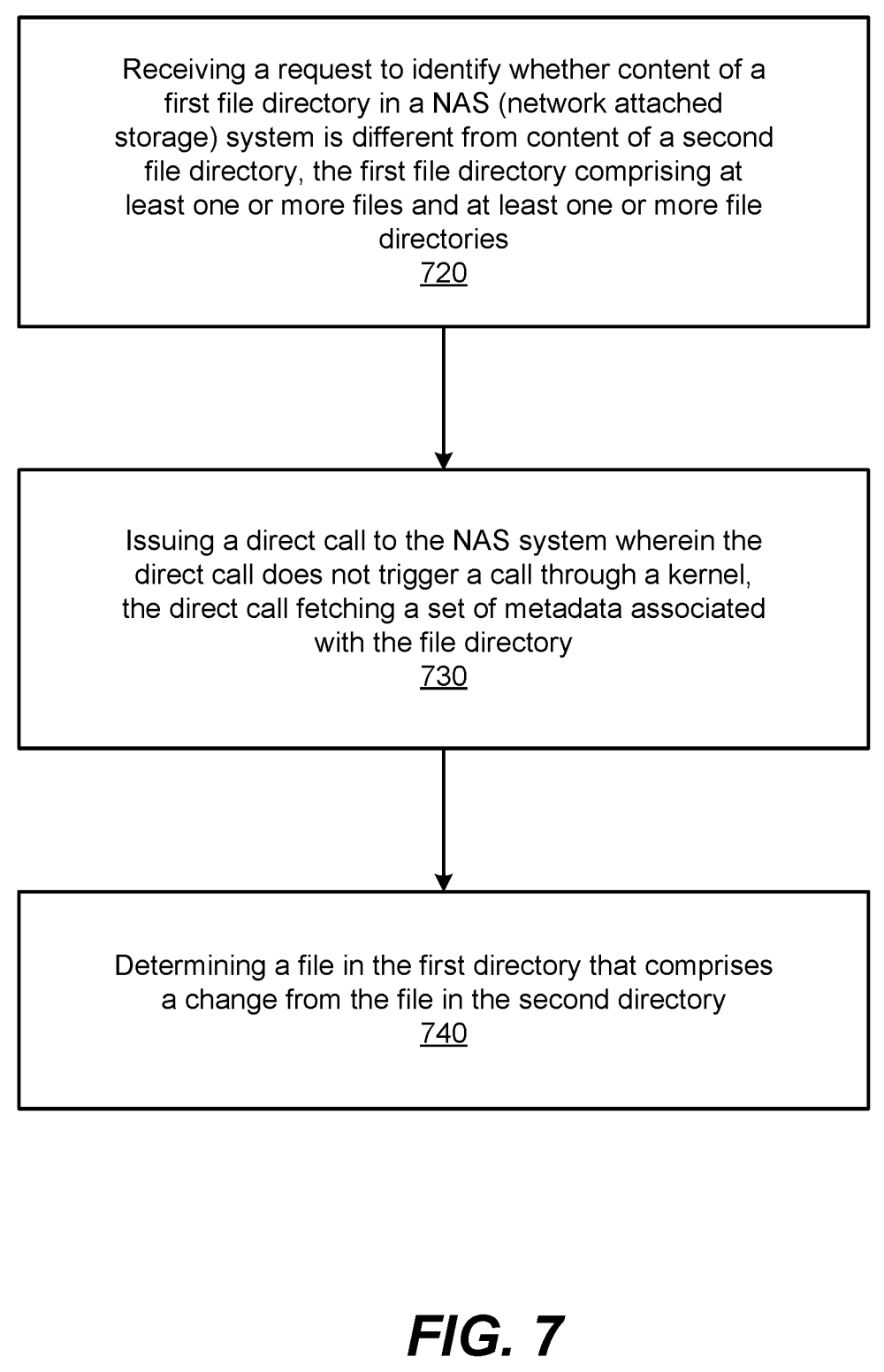

Receiving a request to identify whether content of a
first file directory in a NAS (network attached
storage) system is different from content of a second
file directory, the first file directory comprising at
least one or more files and at least one or more file
directories
720

Issuing a direct call to the NAS system wherein the
direct call does not trigger a call through a kernel,
the direct call fetching a set of metadata associated
with the file directory
730

Determining a file in the first directory that comprises
a change from the file in the second directory
740

FIG. 7

DATA MANAGEMENT SYSTEM FOR DETECTING CHANGES IN A DATA MANAGEMENT SYSTEM

CROSS-REFERENCE TO RELATED APPLICATION

This application claims the benefit of Indian Provisional Application No. 202241044456, filed Aug. 3, 2022, which is herein incorporated by reference for all purposes.

TECHNICAL FIELD

The disclosed embodiments are related to data management systems, and, more specifically, to a data management system that may efficiently detect changes in databases.

BACKGROUND

To protect against data loss, organizations may periodically backup data to a backup system and restore data from the backup system. In some cases, the backup data may comprise files in large sizes such as large data files or a snapshot of virtual disks within a virtual machine. Conventionally, NAS (Network Attached Storage) systems are used for maintaining a large amount of unstructured data. An NAS storage system is usually a storage device connected to a network that allows storage and retrieval of data from a centralized location for authorized network users and clients. However, the existing system poses a challenge for incremental backups as many NAS service providers do not provide a functionality for identifying differences between two snapshots of a file system. Therefore, a more efficient implementation for detecting changes in different snapshots of a NAS system is needed.

BRIEF DESCRIPTION OF THE DRAWINGS

FIG. 6 is a flowchart depicting an example process of identifying a change between databases, in accordance with an embodiment.

FIG. 7 is a flowchart depicting an example process of consolidating data fetching in a change detection process, in accordance with an embodiment.

Figure 1:
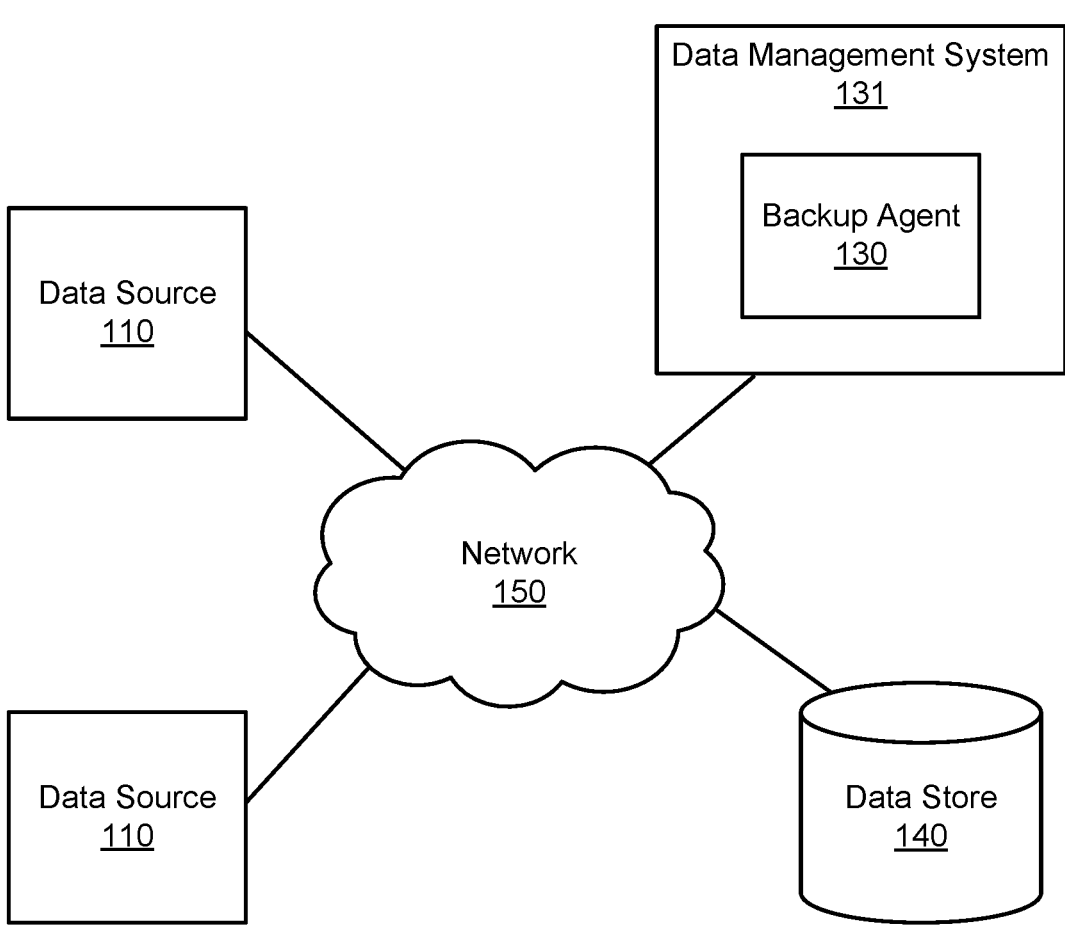
FIG. 1 is a block diagram illustrating a system environment of an example data management system with an incremental backup agent, in accordance with an embodiment.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Configuration Overview

A data management system is disclosed with example embodiments related to systems and processes of change detection associated with files in a NAS system that improve the efficiency and cost of performing incremental backups. The data management system may include a backup agent with an incremental backup agent for performing such efficient incremental backups.

The incremental backup agent may perform backup operations that synchronize database on client side to a server database. In one embodiment, such backup operations are incremental backups, where the incremental backup agent may identify differences between the current directory with the latest backed up version. To perform such scan, the incremental backup agent may first issue a direct RPC (remote procedure call) using SMB (server message block) protocols or NFS (network file system) protocols to fetch all entries of directories with metadata in a single RPC call, instead of issuing one call to fetch metadata for each directory entry, as presented in traditional implementations.

The incremental backup agent, after retrieving metadata for all entries of directories, may identify changes with efficiency by performing checksum changes in a DFS (depth first search) manner. Starting from a root directory, the incremental backup agent may generate a checksum for each directory, with the checksum containing condensed information for files and directories under the directory. The incremental backup agent may then compare the checksums (or may be referred to as fingerprints) on the client side with the retrieved fingerprints, and if the backup agent identifies that the fingerprints match, the incremental backup agent may then go to a deeper level and compare the fingerprints for child directories under the directory. The backup agent may iteratively perform such an operation until a difference in a file is identified. The difference may then be used for incremental backup without reconstructing backup data from scratch.

The disclosed systems and methods provide multiple advantageous technical features. For example, the disclosed incremental backup agent may improve time and network efficiency by reducing the number of network round trips. The incremental backup agent may consolidate multiple data fetching calls into a single call using protocols provided by SMB Direct (Server Message Block) and NFS Direct (Network File System) which are usually available in Linux or Windows Operating Systems. Traditionally, to retrieve metadata under a directory that contains files and child directories, a call is triggered through kernel and such a call is needed for each file, which results in a huge number of network round trips if the number of files is large. The disclosed system may issue a single RPC (remote procedure call) APIs (Application Programming Interface) provided by the Operating Systems without triggering kernel calls, with the single RPC fetching metadata for all entries (e.g., files and directories) under the file directory. Further, the disclosed systems and methods may reduce the processing time on client side for identifying a changed entry in a directory. For example, the disclosed incremental backup agent may, starting from the root directory, compare fingerprints for each child directory in a DFS (Depth-First Search) manner. When a directory record is fetched from a NAS provider, a checksum of the entire record is computed and stored to a database. In subsequent backups when the entire directory record is fetched, the root-level checksums are compared. If the checksums are the same, the incremental backup agent may determine that it is not necessary to go through each entry of the directory and check for modification or change time. The incremental backup agent may then determine to move on to scan the child directories. If the incremental backup agent identifies a modification in the checksum, the incremental backup agent may check each entry in the directory record for modification. As such, the disclosed systems and methods reduce the processing time for comparing directory records on the client side and therefore results in a more efficient change detection process.

The figures (FIGs.) and the following description relate to preferred embodiments by way of illustration only. One of skill in the art may recognize alternative embodiments of the structures and methods disclosed herein as viable alternatives that may be employed without departing from the principles of what is disclosed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Example System Environment

FIG. 1 is a block diagram illustrating a system environment 100 of an example data management system, in accordance with an embodiment. By way of example, the system environment 100 may include one or more data sources 110, a data management system 131 that includes a backup agent 130, a data store 140, and a network 150. In various embodiments, the system environment 100 may include fewer and additional components that are not shown in FIG. 1.

The various components in the system environment 100 may each corresponds to a separate and independent entity or some of the components may be controlled by the same entity. For example, in one embodiment, the data management system 131 and the data store 140 may be controlled and operated by the same data storage provider company while the data source 110 may be controlled by an individual client. In another embodiment, the data management system 131 and the data store 140 may be controlled by separate entities. For example, the data management system 131 may be an entity that utilizes various popular cloud data service providers as data stores 140. In another embodiment, the data management system 131 may be an entity that utilizes NAS (network attached storage) providers such as NetApp, Dell Unity, etc. The components in the system environment 100 may communicate through the network 150. In some cases, some of the components in the environment 100 may also communicate through local connections. For example, the data management system 131 and the data store 140 may communicate locally. In another example, the data source 110 and the target device 120 may communicate locally.

A data source 110 may be a computing device that can transmit and/or receive data via the network 150. The data source 110 can be a client device, a client server, a client database, a virtual machine, a local backup device (e.g., NAS) or another suitable device that has data to be backed up. In one embodiment, the data source 110 may send a request to store, read, search, delete, modify, and/or restore data (e.g., virtual machine data) stored in the data store 140. Data from a data source 110 may be captured as one or more snapshots of the data source 110 and be stored in the data store 140. A client that uses the data source 110 to perform such operations may be referred to as a user or an end user of the data management system 131. The data source 110 also may be referred to as a user device or an end user device. The data source 110 may be any computing device. Examples of such client devices 110 include personal computers (PC), desktop computers, laptop computers, tablets (e.g., APPLE iPADs), smartphones, wearable electronic devices such as smartwatches, or any other suitable electronic devices. The clients may be of different natures such as including individual end users, organizations, businesses, and other clients that use different types of client devices (e.g., target devices) that run on different operating systems. The data source 110 may take the form of software, hardware, or a combination thereof (e.g., some or all of the components of a computing machine of FIG. 8).

The data management system 131 may manage data backup and restoration between the data source 110 and the data store 140. In one embodiment, an operator of the data management system 131 may provide software platforms (e.g., online platforms), software applications for installation in the data source 110, application programming interfaces (APIs) for clients to manage backup and restoration of data, etc. In one embodiment, the data management system 131 manages data of the data source 110 that is stored in the data store 140. For example, the data management system 131 may transmit data to and/or from the data source 110. In another embodiment, the data management system 131 manages data of the data store 140 that is retrieved and restored in the target device 120. For example, the data management system 131 may use a backup agent 130 to transmit data to and/or from the target device 120. In this disclosure, data management servers 130 may collectively and singularly be referred to as a data management system 131, even though the data management system 131 may include more than one computing device. For example, the data management system 131 may be a pool of computing devices that may be located at the same geographical location (e.g., a server room) or distributed geographically (e.g., cloud computing, distributed computing, or in a virtual server network).

The data management system 131 may include a backup agent 130 that creates backups of data of the data source 110. The backup agent 130 may upload the backup data to the data store 140. A backup operation may be triggered by an action performed at a data source 110 or by an event, may be scheduled as a regular backup, or may be in response to an automated backup task initiated by the data management system 131 to a data source 110. In one embodiment, the backup data creation engine 340 may poll a data source 110 periodically and receive files to be backed up and corresponding metadata, such as file names, file sizes, access timestamps, access control information, and the like. In one embodiment, the backup agent 130 may perform incremental backups that leverage data from previous backup cycles to improve efficiency. The backup agent 130 may store the files of the client device as data blocks in the data store 140.

In one embodiment, the backup agent 130 may receive snapshots of the data source 110. A snapshot may be a set of copies of files that reflect the state of the data source 110 and/or the state of the data source 110 at the capture time (e.g., during a checkpoint). A snapshot, in one example, may be an image of the storage (or a portion of the storage) of a data source 110 that is captured at a particular moment in time. The moment in time may be referred to as a checkpoint. A snapshot may be a complete image or an incremental image that includes changes from previous backups. For example, an initial backup of a device may generate a snapshot that captures a complete image of a set of files in the data source 110 (e.g., a complete image of the internal file system 240). Subsequent checkpoints may generate snapshots of incremental images that represent the differential changes of the data source 110.

In one embodiment, a snapshot may be divided into data blocks that are saved in various different locations in the data store 140. A data block may be a set of bits that represent data of a file or multiple files. Files may be of various sizes compared to a data block. For example, a large file may include multiple data blocks while a single data block may contain data of a combination of various small files. Data of a file may be retrieved by the identifiers of data blocks (e.g., an external file address, data blocks' addresses, checksums, etc.) and offsets of the starting and ending data blocks. Various individual data blocks of a snapshot may be stored in different locations of a data store 140 and sometimes may not be grouped. In some data stores 140, a data block may be started in a random location based on the checksum or another identifiable fingerprint of the data block (or the object containing the data block) as the address or identifier of the data block. Some data stores 140 use files as units to save the data instead of dividing files as data blocks that are fixed length.

The data management system 131 may use the backup agent 130 to manage data backup and restoration. The backup agent 130 may include an incremental backup agent 140 that performs backups based on a change in different versions of the backups. The incremental backup agent 140 may consolidate multiple data fetching calls into a single call using protocols provided by SMB Direct (Server Message Block) and NFS Direct (Network File System). The incremental backup agent 140 may issue a single RPC (remote procedure call) APIs (Application Programming Interface) provided by the Operating Systems without triggering kernel calls, with the single RPC fetching metadata for all entries (e.g., files and directories) under the file directory. The incremental backup agent 140 may, starting from the root directory, compare fingerprints for each child directory in a DFS (Depth-First Search) manner. The incremental backup agent 140 is further discussed with FIG. 2.

Figure 8:
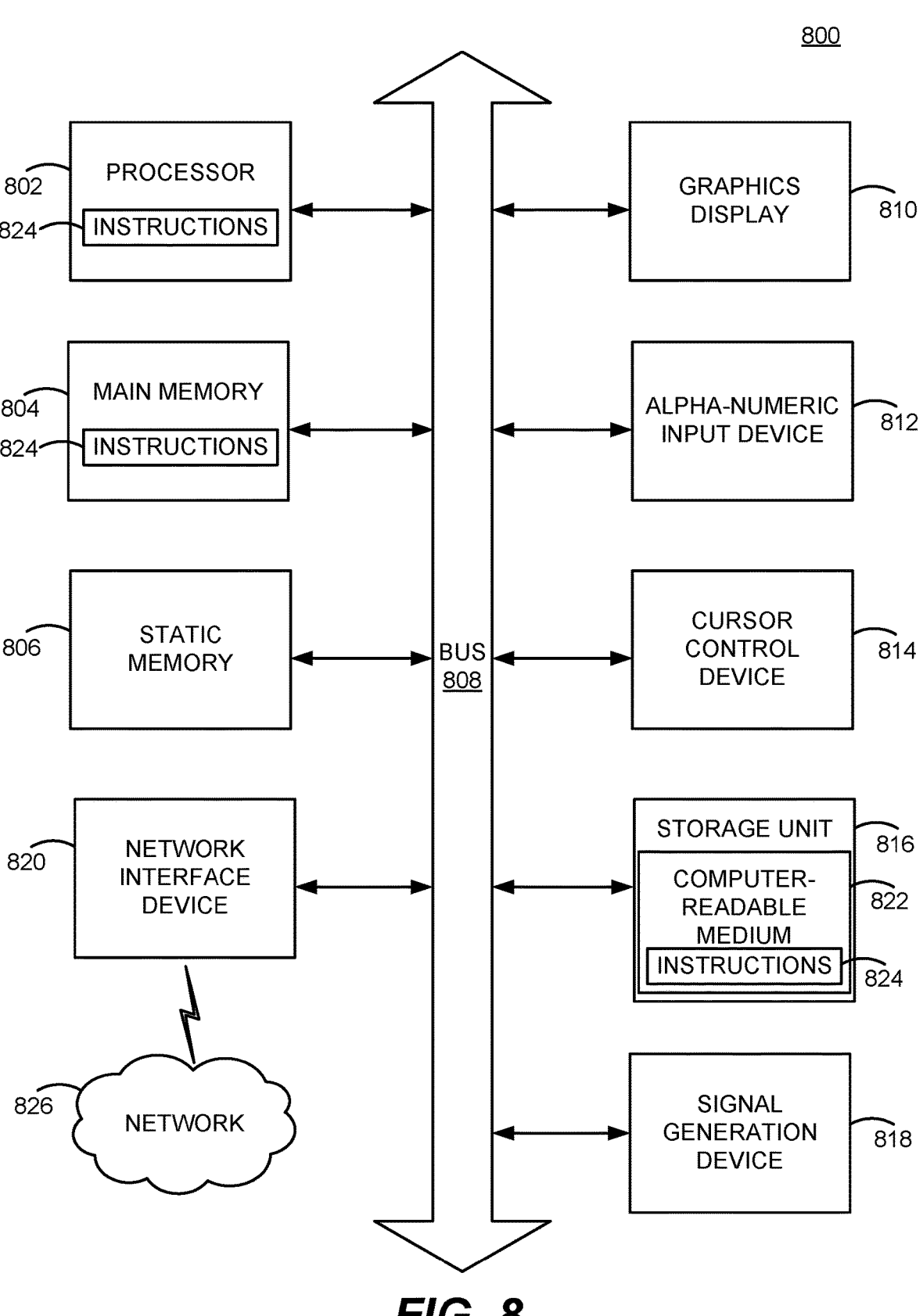
FIG. 8 is a block diagram illustrating components of an example computing machine, in accordance with an embodiment.

In one embodiment, a computing device of the data management system 131 may take the form of software, hardware, or a combination thereof (e.g., some or all of the components of a computing machine of FIG. 8). For example, parts of the data management system 131 may be a PC, a tablet PC, a smartphone, an internet of things (IoT) appliance, or any machine capable of executing instructions that specify actions to be taken by that machine. Parts of the data management system 131 may include one or more processing units and a memory.

The data store 140 may communicate with the data source 110 via the network 150 for capturing and restoring snapshots and/or files of a data source 110. The data store 140 may also work with the data management system 131 to cooperatively perform data transmission of data from the data source 110. The data store 140 may include processes running in the data store 140. The data store 140 may include one or more storage units such as memory that may take the form of non-transitory and non-volatile computer storage medium to store various data. The data store 140 may also be referred to as cloud storage servers. Example cloud storage service providers may include AMAZON AWS, DROPBOX, RACKSPACE CLOUD FILES, AZURE BLOB STORAGE, GOOGLE CLOUD STORAGE, etc. In other cases, instead of cloud storage servers, the data store 140 may be a storage device that is controlled and connected to the data management system 131. For example, the data store 140 may be memory (e.g., hard drives, flash memory, discs, tapes, etc.) used by the data management system 131. The data store 140 may also be NAS (network attached storage) provided by NAS service providers, such as NetApp, Dell Unity, Isilon, etc. A NAS system may be a storage device connected to a network that allows storage and retrieval of data from a centralized location for authorized network users and clients.

The data store 140 may store various backups (e.g., files and/or snapshots of client virtual machines). The data store 140 communicates with the backup agent 130 for reading and writing data between the data source 110 and the data store 140. The data may include files and/or snapshots of the client virtual machines stored at external file address locations in the data store 140.

The data store 140 may use different data storage architectures to manage and arrange the data. The data storage framework for the data store 140 may sometimes be referred to as an external file system in this disclosure, as opposed to a file system that is internal to a virtual machine. A file system defines how an individual computer or system organizes its data, where the computer stores the data, and how the computer monitors where each file is located. A file system may include file directories. In some cases, the external file system may manage data as a file hierarchy. In another example, the external file system may take the form of an object storage system and manage data as objects. In some embodiments, the external file system may manage data as blocks within sectors and tracks. With block storage, files are split into blocks (evenly sized or not) of data, each with its own address. Block storage may be used for most applications, including file storage, snapshot storage, database storage, virtual machine file system (VMFS) volumes, etc.

Each file stored in the data store 140 may include metadata. Metadata is data that describes a file, such as a timestamp, version identifier, file directory including timestamp of edit or access dates, add and carry logical (ACL) checksums, journals including timestamps for change event, etc.

The communications among the data source 110, the data management system 131, and the data store 140 may be transmitted via a network 150, for example, via the Internet. The network 150 provides connections to the components of the system 100 through one or more sub-networks, which may include any combination of local area and/or wide area networks, using both wired and/or wireless communication systems. In one embodiment, a network 150 uses standard communications technologies and/or protocols. For example, a network 150 may include communication links using technologies such as Ethernet, 802.11, worldwide interoperability for microwave access (WiMAX), 3G, 4G, Long Term Evolution (LTE), 5G, code division multiple access (CDMA), digital subscriber line (DSL), etc. Examples of network protocols used for communicating via the network 150 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over a network 150 may be represented using any suitable format, such as hypertext markup language (HTML), extensible markup language (XML), or JSON. In some embodiments, all or some of the communication links of a network 150 may be encrypted using any suitable technique or techniques such as secure sockets layer (SSL), transport layer security (TLS), virtual private networks (VPNs), Internet Protocol security (IPsec), etc. The network 150 also includes links and packet switching networks such as the Internet.

Example Backup Agent

Figure 2:
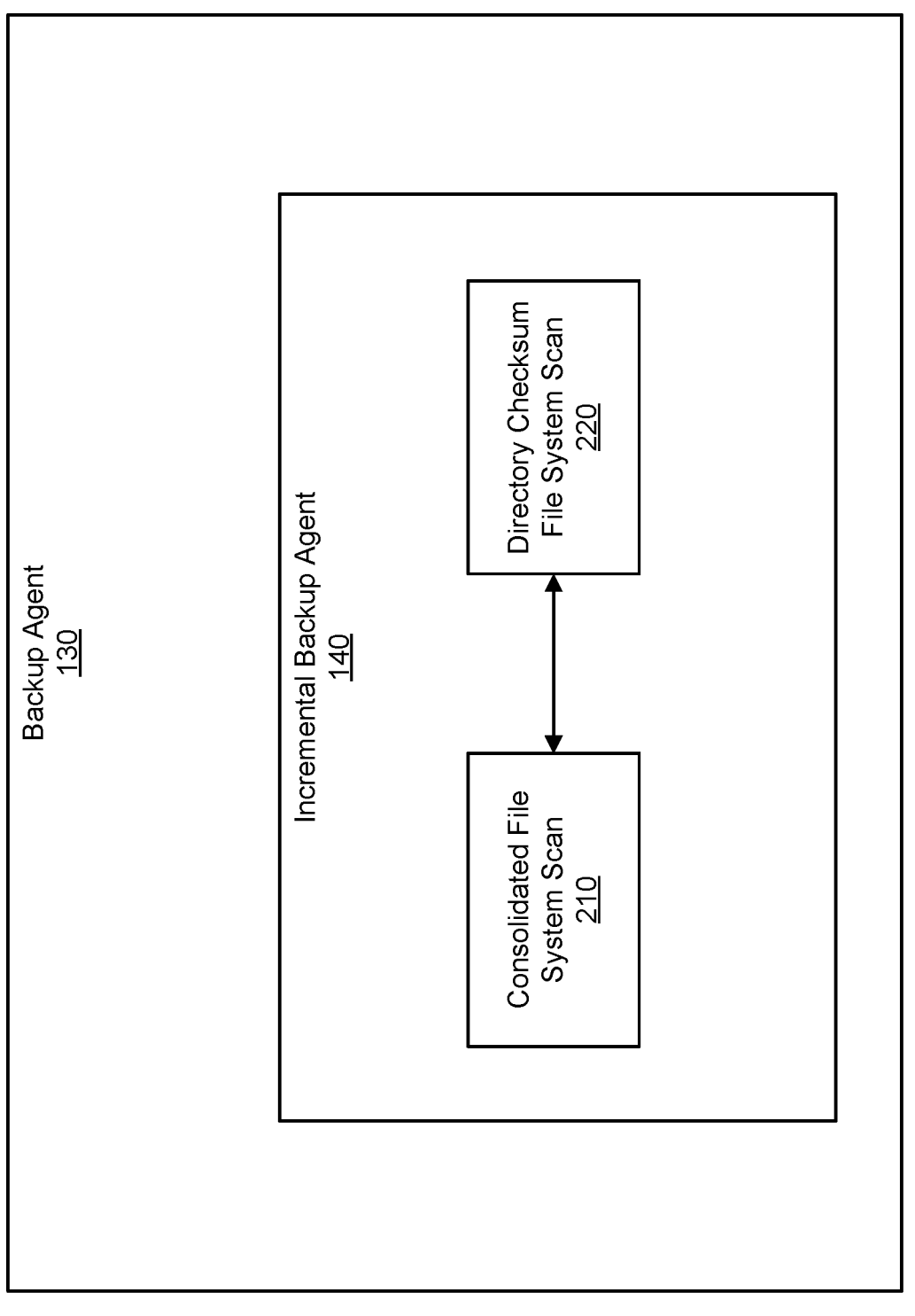
FIG. 2 is a block diagram illustrating an architecture of an example backup agent with an incremental backup agent, in accordance with an embodiment.

Referring now to FIG. 2, illustrated is a block diagram of an architecture of an example backup agent 130 with an incremental backup agent 140, in accordance with an embodiment. An example of detailed hardware architecture of the backup agent 130 and the incremental backup agent 140 is illustrated in FIG. 8.

The backup agent 130 may manage data via backups and/or restorations. In one embodiment, the backup agent 130 may include an incremental backup agent 140 that performs backups based on a change in different versions of backups. The incremental backup agent 140 may include a consolidated file system scan module 210 and a directory checksum file system scan module 220.

The consolidated file system scan module 210 may reduce the number of round trips to fetch metadata by consolidating calls into a single remote procedure call. Traditionally, NAS providers may not provide a single RPC call that identifies each and every difference under a directory. For each directory, the traditional implementation may issue a call to fetch the metadata for each file under the directory, resulting in an inefficient amount of network roundtrips. The consolidated file system scan module 210 may issue a single call to a NAS service provider that fetches all entries of directories in a single call. The consolidated file system scan module 210 may accomplish such a consolidated fetch using protocols provided by SMB (server message block) or NFS (network file system), instead of triggering a call through the kernel as seen in a traditional implementation. Consolidating network round trips using SMB and NFS is discussed in accordance with FIG. 3 in greater detail.

Figure 3:
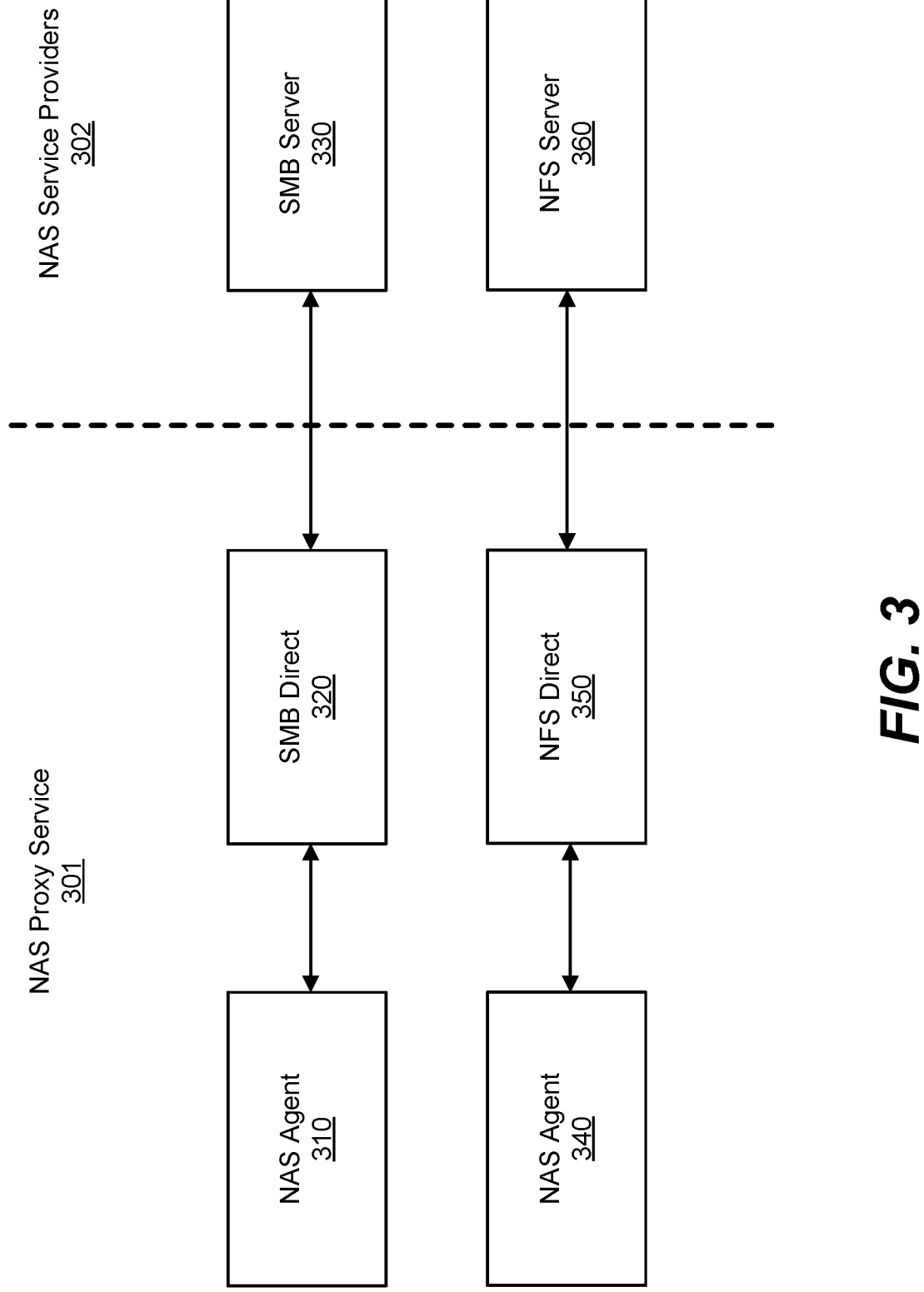
FIG. 3 is a block diagram illustrating an exemplary structure between NAS agents and NAS service providers for consolidated data fetching, in accordance with an embodiment.

FIG. 3 is a block diagram illustrating an exemplary structure between NAS agents and NAS service providers for a consolidated data fetching process, in accordance with an embodiment. The environment setup illustrated in FIG. 3 may include a NAS proxy service 301 and NAS service providers 302. NAS proxy service 301 may include NAS agents 310 which may be client devices such as data sources 110 as illustrated in FIG. 1. NAS proxy service 301 may further include SMB Direct 320 and NFS Direct 350, which are applications that reside on client side. SMB Direct 320 may be an extension of the Server Message Block technology used for file operations on the client side and NFS Direct 350 may be a client-side service that provides various functionalities for accessing NFS storage located on NAS storage devices. In one embodiment, the SMB Direct 320 and the NFS Direct 350 may be provided by operating systems installed on the NAS agents 310. In one embodiment, the SMB Direct 320 and the NFS Direct 350 may come with the operation system such as Linux or Windows Operating Systems installed on the client devices. The NAS service providers 302 may include any entity that provides NAS service with an SMB server 330 or an NFS server 360.

The incremental backup agent 140 may use protocols provided by SMB Direct 320 and NFS Direct 350 for issuing Remote Procedure Calls to NAS service providers 302. In one embodiment, the incremental backup agent 140 may implement the consolidated data fetching using APIs (Application User Interface) provided by the SMB and NFS. For example, the incremental backup agent 140 may use QUERY_DIRECTORY RPC for SMB and NFSPROC3_READDIRPLUS for NFS. The incremental backup agent 140 may issue a single RPC call (e.g., using the APIs provided by SMB and NFS) for fetching metadata associated with all entries (e.g., files and children directories) under a directory, instead of triggering a kernel call for each file under the directory. After obtaining metadata associated with all entries under a directory, the incremental backup agent 140 may compare the obtained metadata with the client-side data for determining changes in the file directory. Further details regarding identifying a change are discussed in the Directory checksum file system scan module 220 illustrated in FIG. 2.

Figure 4:
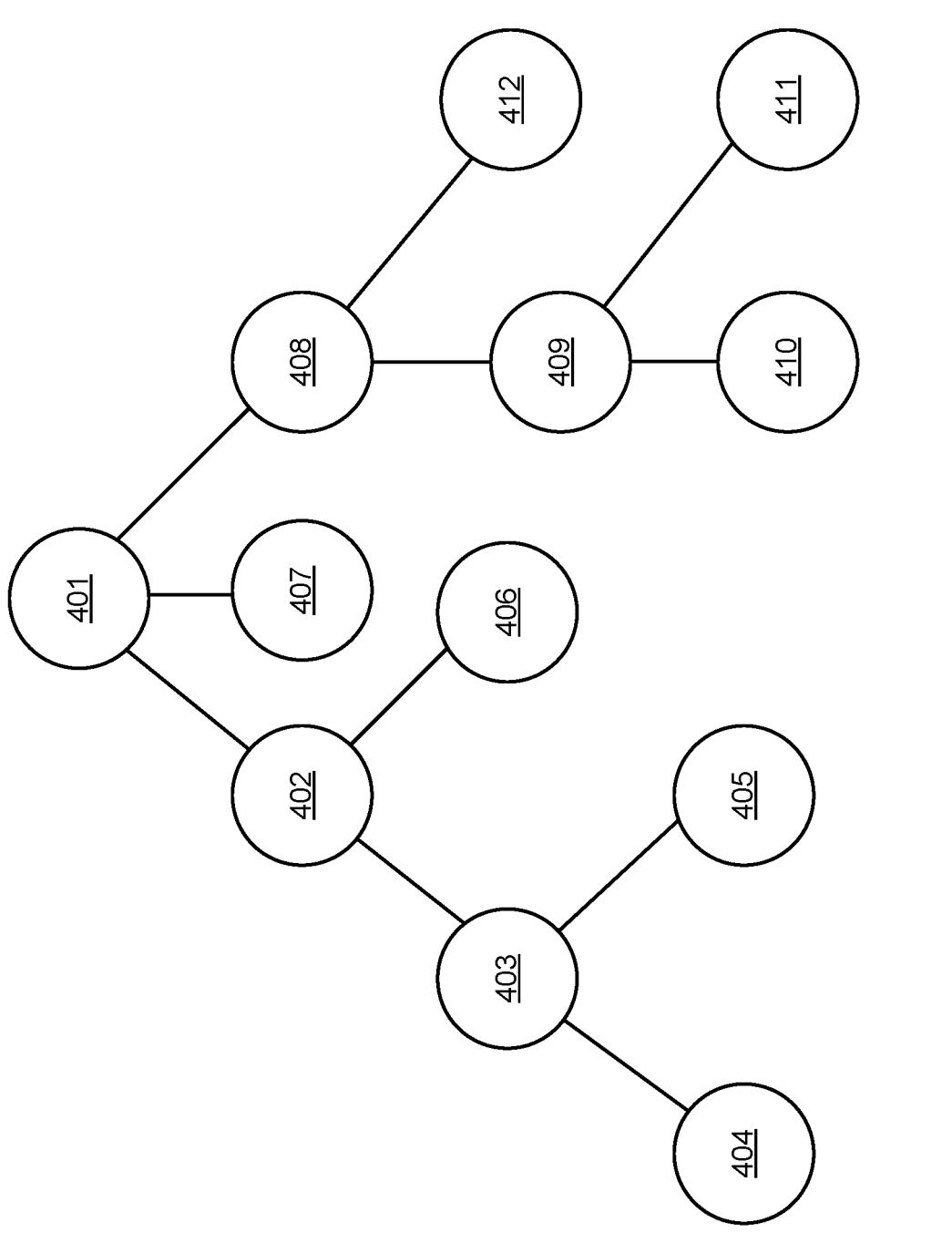
FIG. 4 is an exemplary tree structure for illustrating a depth-first search algorithm, in accordance with an embodiment.

Referring back to FIG. 2, the incremental backup agent 140 may include a directory checksum file system scan module 220 for efficient identification of differences in file systems. The directory checksum file system scan module 220 may compare checksums (or may be referred to as fingerprints) in a DFS (depth-first search) manner for each level of the directory. A DFS traversal may traverse a hierarchical structure by recursively visiting each and every child node of a current node. FIG. 4 illustrates an exemplary hierarchical structure for a DFS traversal.

FIG. 4 is an exemplary hierarchical structure for illustrating a DFS (depth-first search) traversal, in accordance with an embodiment. In the exemplary tree structure illustrated in FIG. 4, a DFS traversal may start with visiting node 401, which may be referred to as a root node. Then, the DFS traversal may visit node 402, which is a child node of the parent node 401. The DFS traversal then visits nodes 403, 404 in order, and when the traversal reaches node 404, which is a leaf node with no child nodes, the DFS traversal may visit node 405, which is another child node of 403. The DFS traversal may visit a child node of the current node if the current node has any child node. After all child nodes associated with a current node is visited, the DFS traversal may go to a level above the current node and visit sibling nodes of the current node in a similar DFS manner. As such, the DFS traversal may visit the nodes in the tree in such an order: 401, 402, 403, 404, 405, 406, 407, 408, 409, 410, 411, and 412.

Referring back to FIG. 2, the directory checksum file system scan module 220 may compare checksums (or may be referred to as fingerprints) in a DFS (depth-first search) manner for each level of the directory. The directory checksum file system scan module 220 may start with comparing a fingerprint of the retrieved root directory with a fingerprint of the client-side database. If the directory checksum file system scan module 220 determines that a fingerprint of a child directory matches the fingerprint of the retrieved data, the directory checksum file system scan module 220 may determine that no change is detected in the directory record and the directory checksum file system scan module 220 may move on to comparing fingerprints for each child directory using a DFS traversal. The directory checksum file system scan module 220 may further generate a checksum for each child directory in the root directory, and the directory checksum file system scan module 220 may further compare the fingerprint corresponding to the child directories with each fingerprint of the child directories of the retrieved data. If the fingerprints do not match, the incremental backup agent 140 may compare each entry (e.g., changes in content, modification time, etc.) in the directory to identify a difference. An example for the directory checksum file system scan module 220 to conduct a scan in a DFS traversal is illustrated in FIG. 5.

Figure 5:
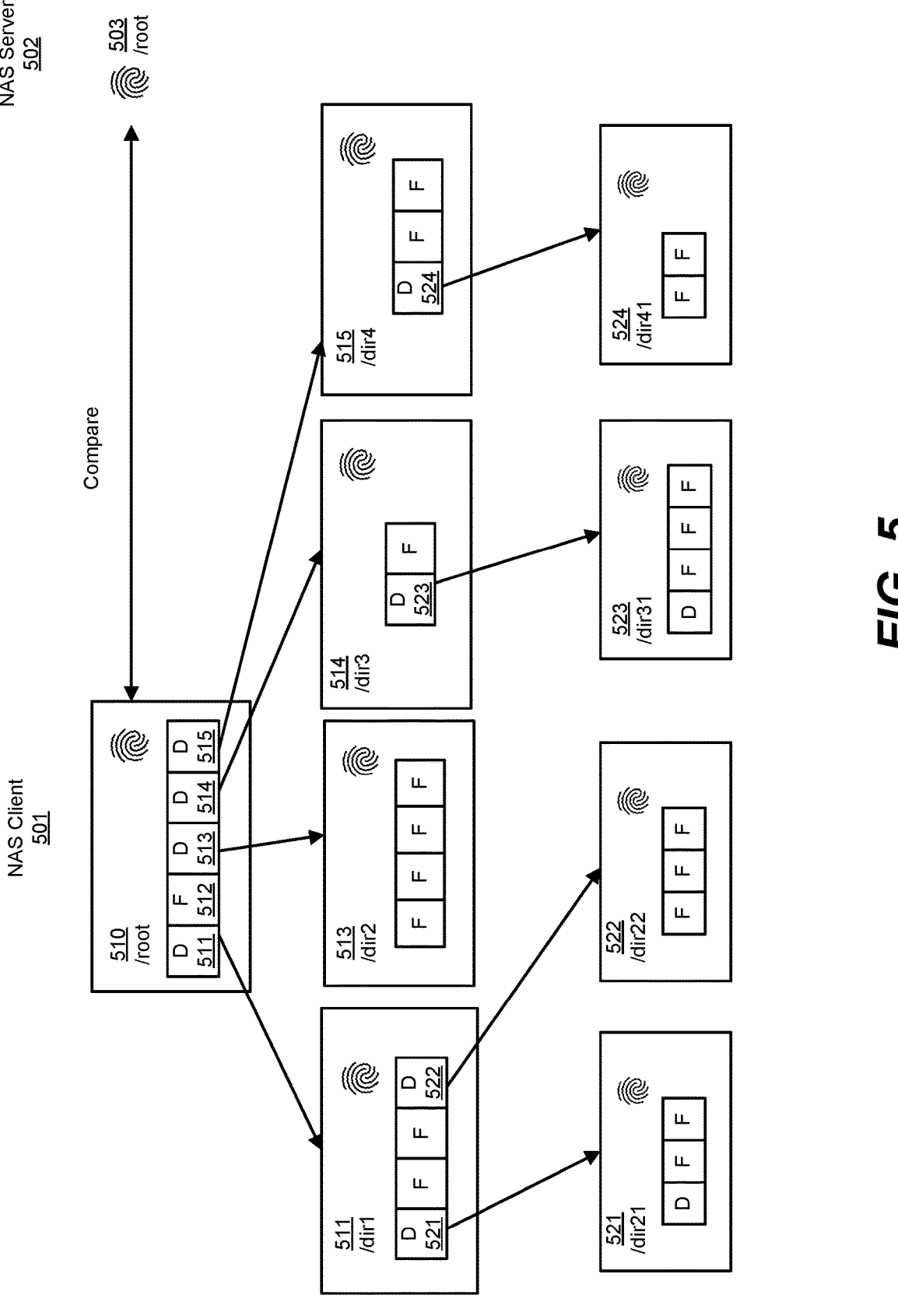
FIG. 5 is an exemplary root directory with child directories, in accordance with an embodiment.

FIG. 5 is an exemplary file directory for illustrating an exemplary process for identifying a difference based on checksums, in accordance with an embodiment. After the consolidated file system scan module 210 retrieves a fingerprint 503 for a root directory from the NAS server 502. The fingerprint 503 may be the fingerprint that is derived from the metadata of a previous version (e.g., the immediately prior snapshot) of the root directory that was backed up in a previous point in time. The directory checksum file system scan module 220 may generate a fingerprint for the root directory 510 on the NAS client 501. This fingerprint may be derived from the metadata of a current version of the root directory that is being backed up currently. The directory checksum file system scan module 220 may compare the two fingerprints and determine if they match. If the two fingerprints match, the directory checksum file system scan module 220 may determine that each entry under the directory has not changed since previous backup and the backup process is complete because no change has occurred. If the two fingerprints do not match, the consolidated file system scan module 210 determines that there can be one or more changes to the directory, one or more child directories, or any files under the directory. The consolidated file system scan module 210 continues the scan to child directories 511, 513-515. The directory checksum file system scan module 220 may generate, for each child directory under the parent directory, a fingerprint and compare each with a previous fingerprint from the NAS server 502. The previous fingerprint is the fingerprint corresponding to the same directory in a previous backup cycle.

As illustrated in FIG. 5, the root directory 510 may contain directory records 511, 513, 514, 515, and a file 512. If the directory checksum file system scan module 220 determines that the fingerprints for root directories does not match, the directory checksum file system scan module 220 may generate a checksum for each child directory 511, 513-515 and scan the child directories. The directory checksum file system scan module 220 may compare the fingerprint for each child directory with the corresponding fingerprints for each child directory on the NAS server 502.

If the directory checksum file system scan module 220 determines that the fingerprint for a particular child directory in the current backup matches the corresponding fingerprint for the same particular child directory in a previous backup, the scan for the particular child directory is completed. The consolidated file system scan module 210 may record that the particular child directory has no change. In some embodiments, no data under the particular child directory needs to be backed up because the same data was backed up in a previous backup cycle. If the fingerprint for a particular child directory in the current backup does not match the corresponding fingerprint for the same particular child directory in a previous backup, the checksum file system scan module 220 may move on to scan a directory in a deeper level in a DFS manner to look for the precise location where a change has occurred. For example, if the current fingerprint for directory 522 does not match the corresponding prior fingerprint of the directory 522 in a previous backup, the directory checksum file system scan module 220 may determine to check each of the three files under the directory 522 to see if one or more files have been changed.

The incremental backup agent 140 continues the process for the directories and files under the root until all changes have been identified. If a current fingerprint of a directory matches the previous fingerprint, the incremental backup agent 140 may skip the scanning of the rest of the subdirectories or files in the particular directory. If a current fingerprint of a directory does not match the previous fingerprint, the incremental backup agent 140 may traverse the particular directory to compare fingerprints corresponding to sub-directories and files until the incremental backup agent 140 finds one or more changes in the current backup.

FIG. 6 is a flowchart depicting an example process of identifying a change in file systems, in accordance with an embodiment. The process illustrated in FIG. 6 may start with the incremental backup agent 140 retrieving 610 a first fingerprint comprising a collection of metadata under a first file directory on a client device. The first file directory may be a directory that includes at least a file and a child file directory. The incremental backup agent 140 may compare 620 the first fingerprint to a second fingerprint of a second file directory. In one embodiment, the second fingerprint may be a previous version of backup of the first directory. The incremental backup agent 140 may compare 630 a first child fingerprint associated with the child file directory and a second child fingerprint associated with a respective child file directory in the second file directory, responsive to determining that the first and the second fingerprints match. The incremental backup agent 140 may iteratively conduct 640 a search through the first directory until a file is identified 650 that is different in the first directory and the second directory. For example, the incremental backup agent 140 may conduct a search that is illustrated in FIG. 5.

FIG. 7 is a flowchart depicting an example process of consolidating data fetching in a change detection process, in accordance with an embodiment. The process illustrated in FIG. 7 starts with the incremental backup agent 140 receiving 720 a request to identify whether content of a first file directory in a NAS system is different from content of a second file directory. The first file directory comprises one or more files and one or more file directories. The incremental backup agent 140 may issue 730 a direct call to the NAS system where the direct call does not trigger a call through a kernel. The incremental backup agent may fetch a set of metadata associated with the file directory using through the direct call. The incremental backup agent may determine 740 a file in the first directory that comprises a change from the file in the second directory and then the incremental backup agent may perform an operation associated with the change to synchronize the change to the first file directory.

Computing Machine Architecture

FIG. 8 is a block diagram illustrating components of an example computing machine that is capable of reading instructions from a computer readable medium and execute them in a processor. A computer described herein may include a single computing machine shown in FIG. 8, a virtual machine, a distributed system that includes multiples nodes of computing machines shown in FIG. 8, or any other suitable arrangement of computing devices.

By way of example, FIG. 8 shows a diagrammatic representation of a computing machine in the example form of a system 800 within which instructions 824 (e.g., software, program code, or machine code), which may be stored in a computer readable medium for causing the machine to perform any one or more of the processes discussed herein may be executed. In some embodiments, the computing machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The structure of a computing machine described in FIG. 8 may correspond to any software, hardware, or combined components shown in FIGS. 1-7, including but not limited to, the data source 110, the data management system 131, and various engines, interfaces, terminals, and machines shown in FIGS. 1-7. While FIG. 8 shows various hardware and software elements, each of the components described in FIGS. 1-6 may include additional or fewer elements.

By way of example, a computing machine may be a personal computer (PC), a tablet PC, a set-top box (STB), a personal digital assistant (PDA), a cellular telephone, a smartphone, a web appliance, a network router, an internet of things (IoT) device, a switch or bridge, or any machine capable of executing instructions 824 that specify actions to be taken by that machine. Further, while only a single machine is illustrated, the term "machine" and "computer" also may be taken to include any collection of machines that individually or jointly execute instructions 824 to perform any one or more of the methodologies discussed herein.

The example system 800 includes one or more processors 802 such as a CPU (central processing unit), a GPU (graphics processing unit), a TPU (tensor processing unit), a DSP (digital signal processor), a system on a chip (SOC), a controller, a state equipment, an application-specific integrated circuit (ASIC), a field-programmable gate array (FPGA), or any combination of these. Parts of the system 800 also may include memory 804 that store computer code including instructions 824 that may cause the processors 802 to perform certain actions when the instructions are executed, directly or indirectly by the processors 802. Memory 804 may be any storage devices including nonvolatile memory, hard drives, and other suitable storage devices. Instructions can be any directions, commands, or orders that may be stored in different forms, such as equipment-readable instructions, programming instructions including source code, and other communication signals and orders. Instructions may be used in a general sense and are not limited to machine-readable codes.

One and more methods described herein improve the operation speed of the processors 802 and reduces the space required for the memory 804. For example, the architecture and methods described herein reduce the complexity of the computation of the processors 802 by applying one or more novel techniques that simplify the steps generating results of the processors 802, and reduce the cost of restoring data. The algorithms described herein also reduce the storage space requirement for memory 804.

The performance of certain of the operations may be distributed among the more than processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations. Even though in the specification or the claims may refer some processes to be performed by a processor, this should be construed to include a joint operation of multiple distributed processors.

The system 800 may include a main memory 804, and a static memory 806, which are configured to communicate with each other via a bus 808. The system 800 may further include a graphics display unit 810 (e.g., a plasma display panel (PDP), a liquid crystal display (LCD), a projector, or a cathode ray tube (CRT)). The graphics display unit 810, controlled by the processors 802, displays a graphical user interface (GUI) to display one or more results and data generated by the processes described herein. The system 800 also may include alphanumeric input device 812 (e.g., a keyboard), a cursor control device 814 (e.g., a mouse, a trackball, a joystick, a motion sensor, or other pointing instrument), a storage unit 816 (a hard drive, a solid state drive, a hybrid drive, a memory disk, etc.), a signal generation device 818 (e.g., a speaker), and a network interface device 820, which also are configured to communicate via the bus 808.

The storage unit 816 includes a computer readable medium 822 on which is stored instructions 824 embodying any one or more of the methodologies or functions described herein. The instructions 824 also may reside, completely or at least partially, within the main memory 804 or within the processor 802 (e.g., within a processor's cache memory) during execution thereof by the system 800, the main memory 804 and the processor 802 also constituting computer readable media. The instructions 824 may be transmitted or received over a network 826 via the network interface device 820.

While computer readable medium 822 is shown in an example embodiment to be a single medium, the term "computer readable medium" should be taken to include a single medium or multiple media (e.g., a centralized or distributed database, or associated caches and servers) able to store instructions (e.g., instructions 824). The computer readable medium may include any medium that is capable of storing instructions (e.g., instructions 824) for execution by the processors (e.g., processors 802) and that causes the processors to perform any one or more of the methodologies disclosed herein. The computer readable medium may include, but not be limited to, data repositories in the form of solid-state memories, optical media, and magnetic media. The computer readable medium does not include a transitory medium such as a propagating signal or a carrier wave.

Additional Considerations

The systems and processes described herein beneficially improve the efficiency and reduce the cost of data retrieval and/or restoration. A large amount of data may be uploaded to a data store as a result of snapshots captured from numerous client devices. By providing a single snapshot to a client device, a data management system may decrease the consumed resources associated with data restoration for a more computational efficient and memory efficient process. Costs may be direct monetary costs to be spent to perform an action (e.g., read, write, store) or other costs such as computer resources and time in performing an action. The restoration of individual files, as opposed to entire disk snapshots, provides a less costly method for data restoration.

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Any feature mentioned in one claim category, e.g., method, can be claimed in another claim category, e.g., computer program product, system, storage medium, as well. The dependencies or references back in the attached claims are chosen for formal reasons only. However, any subject matter resulting from a deliberate reference back to any previous claims (in particular multiple dependencies) can be claimed as well, so that any combination of claims and the features thereof is disclosed and can be claimed regardless of the dependencies chosen in the attached claims. The subject-matter may include not only the combinations of features as set out in the disclosed embodiments but also any other combination of features from different embodiments. Various features mentioned in the different embodiments can be combined with explicit mentioning of such combination or arrangement in an example embodiment or without any explicit mentioning. Furthermore, any of the embodiments and features described or depicted herein may be claimed in a separate claim and/or in any combination with any embodiment or feature described or depicted herein or with any of the features.

Some portions of this description describe the embodiments in terms of algorithms and symbolic representations of operations on information. These operations and algorithmic descriptions, while described functionally, computationally, or logically, are understood to be implemented by computer programs or equivalent electrical circuits, microcode, or the like. Furthermore, it has also proven convenient at times, to refer to these arrangements of operations as engines, without loss of generality. The described operations and their associated engines may be embodied in software, firmware, hardware, or any combinations thereof.

Any of the steps, operations, or processes described herein may be performed or implemented with one or more hardware or software engines, alone or in combination with other devices. In one embodiment, a software engine is implemented with a computer program product comprising a computer readable medium containing computer program code, which can be executed by a computer processor for performing any or all of the steps, operations, or processes described. The term "steps" does not mandate or imply a particular order. For example, while this disclosure may describe a process that includes multiple steps sequentially with arrows present in a flowchart, the steps in the process do not need to be performed by the specific order claimed or described in the disclosure. Some steps may be performed before others even though the other steps are claimed or described first in this disclosure. Likewise, any use of (i), (ii), (iii), etc., or (a), (b), (c), etc. in the specification or in the claims, unless specified, is used to better enumerate items or steps and also does not mandate a particular order.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein. In addition, the term "each" used in the specification and claims does not imply that every or all elements in a group need to fit the description associated with the term "each." For example, "each member is associated with element A" does not imply that all members are associated with an element A. Instead, the term "each" only implies that a member (of some of the members), in a singular form, is associated with an element A. In claims, the use of a singular form of a noun may imply at least one element even though a plural form is not used.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights.

What is claimed is:

1. A system comprising:
a processor; and
a non-transitory computer-readable storage medium storing instructions for conducting an incremental backup of a data source, the instructions when executed by the processor cause the processor to:
receive a request to identify one or more changes in a file system;
retrieve, in a single call, a collection of directory-level metadata for a first file directory, the directory-level metadata being metadata for a directory instead of a file, wherein the retrieval of the collection of the directory-level metadata is performed without retrieving individual file content and prior to comparing any specific file content;
determine a first directory checksum derived from the directory-level metadata that is the metadata for the first file directory, wherein the first file directory comprises at least a file and a child file directory;
compare the first directory checksum to a second directory checksum of a second file directory;
compare, responsive to determining that the first and the second directory checksums match, a first child directory checksum associated with the child file directory and a second child directory checksum associated with a respective child file directory in the second file directory;
conduct, responsive to determining that the first and the second directory checksums match, an iterative search traversing through the first file directory; and
identify a file that is different in the first file directory and the second file directory.

2. The system of claim 1, wherein the second file directory resides in a Network Attached Storage (NAS) system.

3. The system of claim 1, wherein the collection of metadata is gathered by transmitting a directory-metadata call to the data source, the directory-metadata call requesting for metadata of the first file directory.

4. The system of claim 3, wherein the directory-metadata call is a single system call that fetches metadata of a directory.

5. The system of claim 1, wherein the first file directory and the second file directory are the same file directory, the second file directory being a previous version of the first file directory that was backed up in a previous point in time.

6. The system of claim 1, wherein the instructions when executed by the processor cause the processor to further perform steps including:
comparing, responsive to the first directory checksum being different from the second directory checksum, each entry under the first directory with each entry under the second directory, the comparing including content for each entry and modification time for each entry.

7. The system of claim 1, wherein the instructions when executed by the processor cause the processor to further perform steps including:
requesting, as part of the incremental backup and from the data source, one or more files in one of the child file directories whose child directory checksum is different from the child directory checksum of the second file directory.

8. A system comprising:

a processor; and a non-transitory computer-readable storage medium storing instructions for conducting an incremental backup of a source data base, the instructions when executed by the processor cause the processor to:

receive a request to identify whether content of a first file directory in a NAS (network attached storage) system is different from content of a second file directory, the first file directory comprising at least one or more files and at least one or more file directories;

issue a direct call to the NAS system wherein the direct call does not trigger a call through a kernel, the direct call fetching a set of metadata associated with the first file directory; and determine a file in the first directory that comprises a change from the file in the second directory, wherein determining the file in the first directory that comprises a change from the file in the second directory comprises:

retrieve, in a single call of the direct call to the NAS system, a collection of directory-level metadata for a first file directory, the directory-level metadata being metadata for a directory instead of a file, wherein the retrieval of the collection of the directory-level metadata is performed without retrieving individual file content and prior to comparing any specific file content;

determine a first directory checksum derived from the directory-level metadata that is the metadata for the first file directory, wherein the first file directory comprises at least a file and a child file directory, compare the first directory checksum to a second directory checksum of the second file directory, and conduct, responsive to determining that the first and the second directory checksums match, an iterative search traversing through the first file directory.

9. The system of claim 8, wherein the direct call is a single call that fetches multiple directories under the first file directory.

10. The system of claim 9, wherein the direct call is a single call that fetches multiple sets of metadata associated with the multiple directories.

11. The system of claim 8, wherein the first file directory and the second file directory are a same directory with different contents, the content in the second file directory being a previous version of the content in a previous time point.

12. The system of claim 8, wherein the first file directory is managed through a Server Message Block (SMB).

13. The system of claim 12, wherein the request is implemented using a SMB interface QUERY_DIRECTORY RPC.

14. The system of claim 8, wherein the first file directory is managed through a Network File System (NFS).

15. The system of claim 14, wherein the request is implemented using a NFS interface NFSPROC3_READDIRPLUS.

16. A non-transitory computer-readable storage medium for storing executable computer instructions for conducting an incremental backup of a data source, wherein the computer instructions, when executed by one or more processors, cause the one or more processors to perform operations, the instructions comprising instructions to:

receive a request to identify one or more changes in a file system;

retrieve, in a single call, a collection of directory-level metadata for a first file directory, the directory-level metadata being metadata for a directory instead of a file, wherein the retrieval of the collection of the directory-level metadata is performed without retrieving individual file content and prior to comparing any specific file content;

determine a first directory checksum derived from the directory-level metadata that is the metadata for the first file directory, wherein the first file directory comprises at least a file and a child file directory;

compare the first directory checksum to a second directory checksum of a second file directory;

compare, responsive to determining that the first and the second directory checksums match, a first child directory checksum associated with the child file directory and a second child directory checksum associated with a respective child file directory in the second file directory;

conduct, responsive to determining that the first and the second directory checksums match, an iterative search traversing through the first file directory; and identify a file that is different in the first file directory and the second file directory.

17. The non-transitory computer-readable storage medium of claim 16, wherein the second file directory resides in a Network Attached Storage (NAS) system.

18. The non-transitory computer-readable storage medium of claim 16, wherein the collection of metadata is gathered by transmitting a directory-metadata call to the data source, the directory-metadata call requesting for metadata of the first file directory.

19. The non-transitory computer-readable storage medium of claim 16, wherein the instructions further comprise instructions to:

transmit, responsive to the first directory checksum being different from the second directory checksum, one or more additional directory-metadata calls to the data source for requesting metadata associated with one or more child file directories.

20. The non-transitory computer-readable storage medium of claim 16, wherein the first file directory and the second file directory are the same file directory, the second file directory being a previous version of the first file directory that was backed up in a previous point in time.

* * * * *